United States Patent [19]

Hayashi et al.

[11] Patent Number: 4,612,977
[45] Date of Patent: Sep. 23, 1986

[54] DRAIN DEVICE OF AUTOMOTIVE RADIATOR

[75] Inventors: Toshihiko Hayashi, Zama; Yoshitomi Matsuzaki, Hatano, both of Japan

[73] Assignee: Nissan Motor Co., Ltd., Yokohama, Japan

[21] Appl. No.: 765,820

[22] Filed: Aug. 15, 1985

[30] Foreign Application Priority Data

Aug. 28, 1984 [JP] Japan .................. 59-177489

[51] Int. Cl.$^4$ ............................................. F16K 5/00
[52] U.S. Cl. .................................... 165/71; 251/144; 251/215; 248/74.2
[58] Field of Search .................. 165/71; 251/144, 215, 251/216, 218, 219, 223, 224; 184/1.5; 248/74.2

[56] References Cited

U.S. PATENT DOCUMENTS 2,796,148  6/1957  Banks ........................ 184/1.5 X
2,827,913  3/1958  Wagner ...................... 251/216 X
3,103,947  9/1963  Mueller ...................... 251/144 X

FOREIGN PATENT DOCUMENTS 3015534  11/1981  Fed. Rep. of Germany ..... 248/74.2

Primary Examiner—William R. Cline
Assistant Examiner—Richard R. Cole
Attorney, Agent, or Firm—Leydig, Voit & Mayer, Ltd.

[57] ABSTRACT

A collar member disposed about a drain bore in the radiator. A drain cock is received within the collar member and has a portion which enters the drain hose is fixed to a drain bore of the radiator and seals the drain bore when tightened. An axial groove in the drain cock places the interior of the radiator in communication with a chamber within the collar when the drain cock is loosened, so that fluid may be drained from the radiator through the chamber and the drain hose. A hose holder is connected to a fan shroud to hold a portion of the drain hose in place.

6 Claims, 5 Drawing Figures

DRAIN DEVICE OF AUTOMOTIVE RADIATOR

BACKGROUND OF THE INVENTION

1. Field of the Invention

The present invention relates in general to an automotive radiator, and more particularly to a drain device therefor which facilitates drainage of cooling water (or coolant) therefrom.

2. Description of the Prior Art

Hitherto, various kinds of drain devices for automotive radiators have been proposed and put into practical use. However, some of them have suffered from the drawback that upon draining of coolant from the radiator, splashing of coolant tends to occur thereby soiling parts adjacent and/or near the radiator. In order to solve this drawback, it has been proposed to use a drain hose which is fixed to the drain bore of the radiator. However, since the disposition of the hose is given little thought, it sometimes occurs during the running of the vehicle that the hose swings and becomes entangled with parts of the vehicle. Under these conditions, upon coolant being drained, not only considerable soiling of the engine and associated apparatus occurs, but also smooth and quick drainage of the coolant is prevented.

SUMMARY OF THE INVENTION

It is therefore an object of the present invention to provide an improved drain device of a radiator, which is free of the above-mentioned drawbacks.

According to the present invention, there is provided an improved drain device in which a hose holder is connected to a fan shroud to tightly hold the drain hose in position.

According to the present invention, there is provided a drain device of a radiator in a motor vehicle which has a fan shroud extending from the radiator toward an engine of the vehicle. The drain device comprises an annular ridge formed on the radiator in a manner to surround a drain bore of the same, a drain cock screwed to the drain bore of the radiator to seal the same, a collar member sealingly and rotatably disposed about both the annular ridge and the drain cock to define therebetween at least one chamber which becomes in communication with the interior of the radiator when the drain cock loosens, the collar member being formed with an outlet opening communicated with the chamber and rotatable about its axis relative to both the annular ridge and the drain cock, a drain hose extending from the outlet opening of the collar member to a given portion of the vehicle, and a hose holder connected to the fan shroud and holding a portion of the drain hose in position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
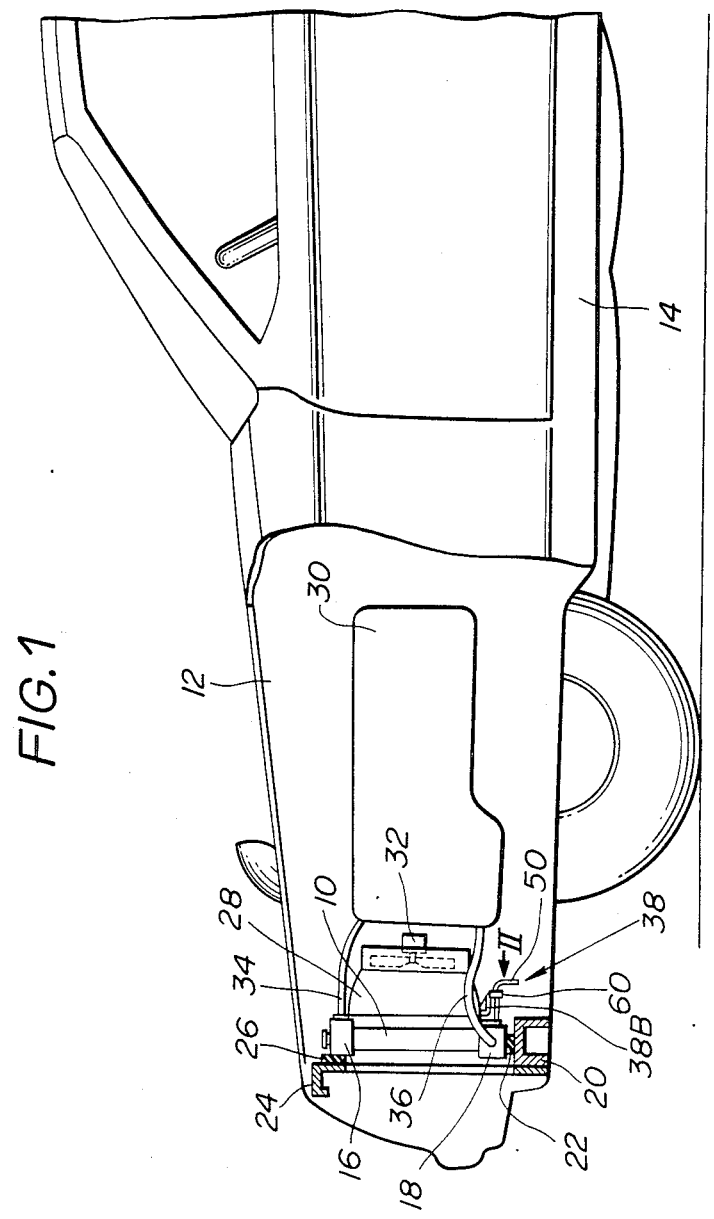
FIG. 1 is a front side view of a motor vehicle on which a radiator equipped with an improved drain device according to the present invention is mounted.

Referring to FIG. 1 of the drawings, there is shown an embodiment of the present invention, which is a drain device 38 associated with a radiator 10 installed in an engine room 12 of a motor vehicle 14. The radiator 10 is provided with upper and lower tanks 16 and 18 and placed at the position where natural air draft is given when the vehicle 14 runs. More particularly, the radiator 10 is mounted on a cross member 20 through a shock absorbing member 22 (which is constructed of, for example, rubber material). A radiator core support member 24 is arranged in front of the radiator 10. Another shock absorbing member 26 is disposed between the support member 24 and the upper tank 16 of the radiator 10. Although not shown in the drawing, known technique is employed for connecting the radiator 10 to the support member 24. A fan shroud 28 of plastics is connected to the rear side of the radiator 10 and extends therefrom toward an engine 30. An electric fan 32 is mounted to the extending or rear end of the fan shroud 28, which, upon energization, produces cooling air flow passing through the radiator 10. Inlet and outlet radiator hoses 34 and 36 extend between the outlet of the water jacket of the engine 30 and the upper tank 16 of the radiator 10 and between the inlet of the water jacket and the lower tank 18, respectively.

Figure 2:
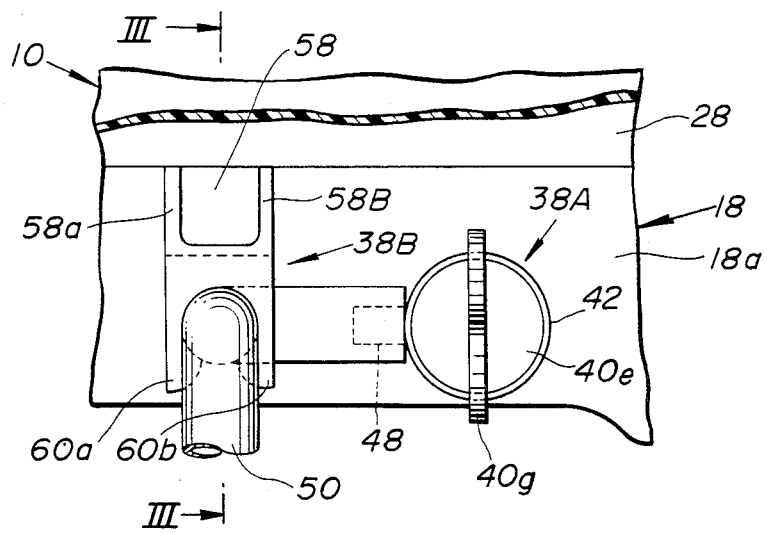
FIG. 2 is a partial and enlarged view of the portion indicated by the arrow II of FIG. 1.
Figure 3:
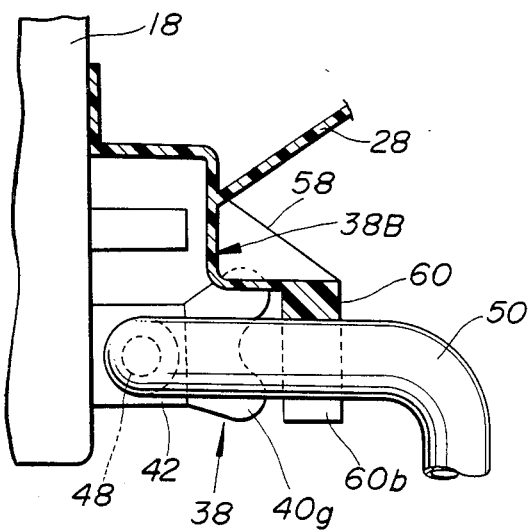
FIG. 3 is a sectional view taken alolng the line III—III of FIG. 2.

As will become apparent as the description proceeds, the improved drain device 38 according to the present invention comprises generally a drain device proper 38A connected to the lower tank 18 of the radiator 10, and a hose holder 38B connected to the fan shroud 28. These two major parts 38A and 38B are positioned adjacent to each other as is seen from FIGS. 2 and 3.

Figure 4:
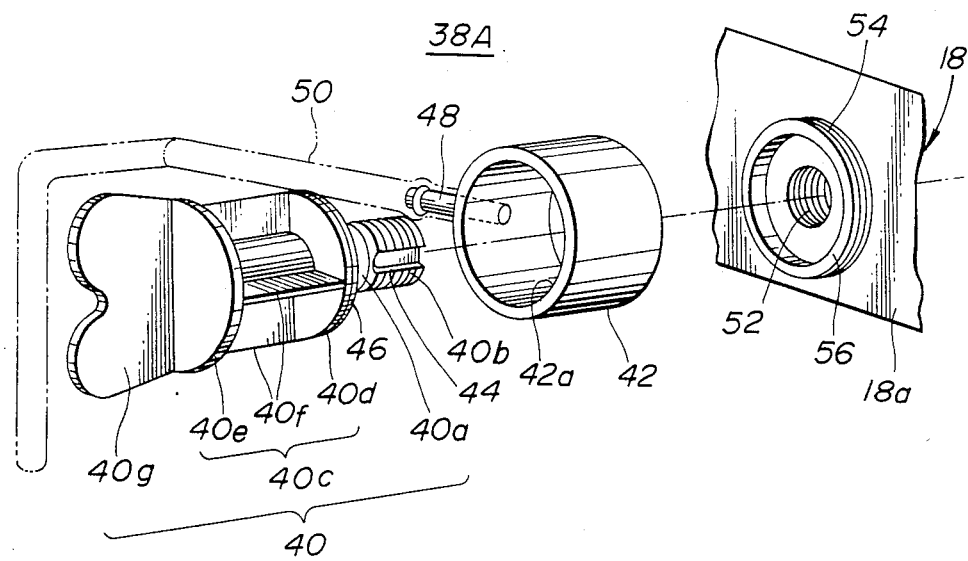
FIG. 4 is an exploded perspective view of a drain device proper of the present invention.

As is seen from FIG. 4, the drain device proper 38A comprises generally a drain cock 40 and a guide collar 42 which are assembled together and detachably connected to a rear wall 18a of the lower tank 18 of the radiator 10. The drain cock 40 includes a cylindrical base portion 40a having at its one end a threaded bolt portion 40b and at the other end a guide collar support portion 40c. The bolt portion 40b is formed with a groove 44 which extends axially to the extreme end of the bolt portion 40b, as shown. The guide collar support portion 40c includes two axially spaced circular flanges 40d and 40e and four equally angled ribs 40f, each extending axially between the two circular flanges 40d and 40e. The outside circular flange 40e is integrally formed with a handle plate 40g. An O-ring 46 is disposed about the base portion 40a with one side thereof contacting with the inside circular flange 40d. The guide collar 42 has a cylindrical bore 42a which is sized to sealingly and slidably receive therein the guide collar support portion 40c of the drain cock 40. The guide collar 42 is provided with a connecting pipe 48 to which a drain hose 50 having two turns is connected. The drain hose 50 is constructed of a semi-rigid material, such as plastics, rubber or the like, which can support its own weight. Upon assembly, the guide collar 42 is so oriented that the connecting pipe 48 extends horizontally.

The rear wall 18a of the lower tank 18 of the radiator 10 is formed with a threaded bore 52 which is sized to match with the afore-mentioned bolt portion 40b of the drain cock 40. An annular ridge 54 is integrally formed on the rear wall 18a in a manner to concentrically surround the bore 52. The annular ridge 54 is sized to be sealingly and slidably put in the bore 42a of the guide collar 42. The annular ridge 54 has a flat surface 56 at the extreme end thereof.

Figure 5:
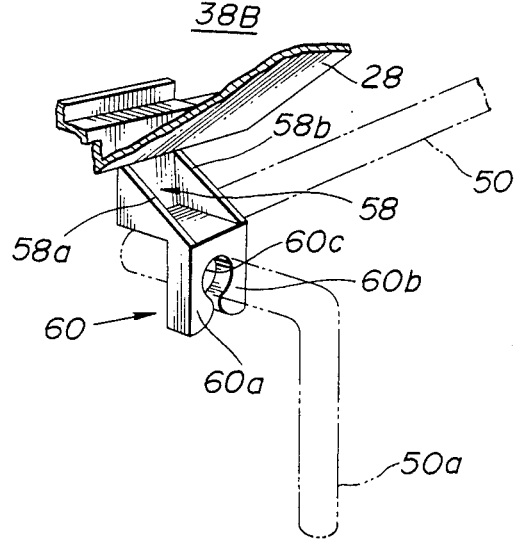
FIG. 5 is a perspective view of a hose holder which constitutes a part of the present invention.

As is best understood from FIG. 5, the hose holder 38B is connected to a lower portion of the fan shroud 28 near the lower tank 18 of the condenser 10. If desired, the hose holder 38B may be integral with the fan shroud 28. Thus, when the fan shroud 28 is constructed of plastics, monoblock moulding technique can be used for forming an integral hose holder 38B on the fan shroud 28.

The hose holder 38B has a generally L-shaped configuration and comprises a base portion 58 extending downward from a lower edge of the fan shroud 28 and a clip portion 60 extending downward from a rear end of the base portion 58. The base portion 58 has two triangular reinforcing ribs 58a and 58b, and the clip portion 60 has two spaced arms 60a and 60b each having a semicircular recess 60c at the inside wall thereof. As is seen from FIG. 1, the hose holder 38B is so sized that the clip portion 60 extends over the cross member 20 of the vehicle 14.

Assembly of the drain device 38 is carried out as follows.

The drain cock 40 is coupled with the guide collar 42 with the guide collar support portion 40c put in the cylindrical bore 42a of the guide collar 42, and thereafter the drain cock 40 is turned about the axis thereof having the bolt portion 40b pressed against the bore 52 of the radiator lower tank 18. With this, the drain cock is tightly screwed or fixed to the drain bore 52 compressing the O-ring 46 between the flat extreme end 56 of the annular ridge 54 and the inside circular flange 40d, so that the bore 52 is sealed. As is described herein above, upon assembly, the guide collar 42 is so oriented that the connecting pipe 48 extends substantially horizontally as shown in FIG. 4. Then, the drain hose 50 is gripped by the clip portion 60 of the hose holder 38B, as is seen from FIG. 5. Fitting the drain hose 50 to the holder 38B is so made that the outlet 50a (see FIG. 5) of the hose 50 is directed toward a desired position where no parts of the vehicle are arranged.

When drainage of coolant is required, the drain cock 40 is turned in the reversed direction to such a degree that the groove 44 of the bolt portion 40b is exposed to the interior of the guide collar 42. With this, the water in the radiator 40 flows out through the groove 44 into the guide collar 42 and thus discharges to the outside of the radiator 10 through the drain hose 50.

In accordance with the present invention, the following advantageous matters are expected, which are:

Since a portion (viz., leading end portion) of the drain hose 50 is held by the fixed hose holder 38B, swinging of the hose 50 during the running of the vehicle does not occur. Thus, the undesirable entanglement of the hose with parts of the vehicle never occurs.

Since the guide collar 42 is rotatably disposed about the drain cock 40, the turning of the drain cock does not induce a rotation of the guide collar 42. Thus, it never occurs that the drain hose 50 is bent up or down at the connecting pipe 48 even when the drain cock 40 is manipulated. Thus, drainage of coolant is smoothly and quickly achieved. This smooth drainage is much assured by the use of the semi-rigid hose 50.

Since the disposition of the drain hose 50 is fixedly made, manipulation of the drain cock 40 by the operator can be achieved without interruption of the hose.

What is claimed is:

1. In a motor vehicle having a radiator and a fan shroud which extends from said radiator toward an engine of the vehicle
    a drain device for the radiator, comprising:
    an annular ridge formed on said radiator in a manner to surround a drain bore of the same;
    a drain cock means screwed to said drain bore of the radiator to seal the same, said drain cock means including a portion for entering said drain bore having an axial groove;
    a collar member sealingly and rotatably disposed about both said annular ridge and said drain cock means to define therebetween at least one chamber which becomes in conmunication with the interior of the radiator via said axial groove when said drain cock means is loosened, said drain cock means having a guide collar support portion for engagement with the inside of said collar member and a sealing element for engagement with said annular ridge to seal the drain bore of the radiator when said drain cock means is tightened, said collar member being formed with an outlet opening communicated with said chamber and said collar being rotatable about its axis relative to both said annular ridge and said drain cock;
    a drain hose extending from said outlet opening of the collar member to a given portion of the vehicle; and
    a hose holder integral with said fan shroud and holding a portion of said drain hose in place, said hose holder comprising a base portion reinforced by ribs integral therewith, and a clip portion extending from one end of said base portion and including two spaced arms by which a portion of said drain hose is gripped.

2. A drain device as claimed in claim 1, in which said two spaced arms have at the mutually facing sides respective semicircular recessess within which the portion of the drain hose is received.

3. A drain device as claimed in claim 1, further comprising a connecting pipe which is fixed to said collar member to connect said outlet opening with said drain hose.

4. A drain device as claimed in claim 3, in which upon proper assembly thereof, said collar member is so oriented that said connecting pipe extends substantially horizontally.

5. A drain device as claimed in claim 1, in which said drain hose is constructed of semi-rigid material.

6. A drain device as claimed in claim 5, in which said drain hose is constructed to have at least two turns.

* * * * *